United States Patent [19]
Howard et al.

[11] 3,728,847
[45] Apr. 24, 1973

[54] FILTER AND DUST COLLECTING BAG FOR UPRIGHT VACUUM CLEANERS

[75] Inventors: Sol Howard; Robert Schaaf, both of Brooklyn, N.Y.

[73] Assignee: Mil-An Mfg. Corp., Brooklyn, N.Y.

[22] Filed: Aug. 17, 1970

[21] Appl. No.: 64,397

[52] U.S. Cl. .................. 55/371, 55/373, 15/347, 15/349, 55/DIG. 2
[51] Int. Cl. ............................................ B01d 46/04
[58] Field of Search ...................... 55/366, 368, 369, 55/371, 373, DIG. 2, DIG. 3; 15/347, 349

[56] References Cited

UNITED STATES PATENTS

| | | | |
|---|---|---|---|
| 2,122,568 | 7/1938 | Gasner et al. | 55/371 |
| 2,710,072 | 6/1955 | Brace | 55/371 X |

Primary Examiner—Arthur D. Kellogg
Attorney—Friedman & Goodman

[57] ABSTRACT

A vacuum cleaner dust collecting bag having a main bag of an air permeable material and an air conducting tube. The tube is provided with an intake coupling at one end with the other end being secured to the main bag. A dust-tight coupling collar extends from the tube into the main bag for communication therebetween. The coupling collar is adapted for the attachment thereto of a disposable lining or insert of an air permeable material to collect the dust. The dust collecting bag is adapted for readily attaching to or detaching from an upright vacuum cleaner. The main bag is provided with opening and closing elements for the insertion or removal of the lining.

8 Claims, 4 Drawing Figures

Patented April 24, 1973
3,728,847
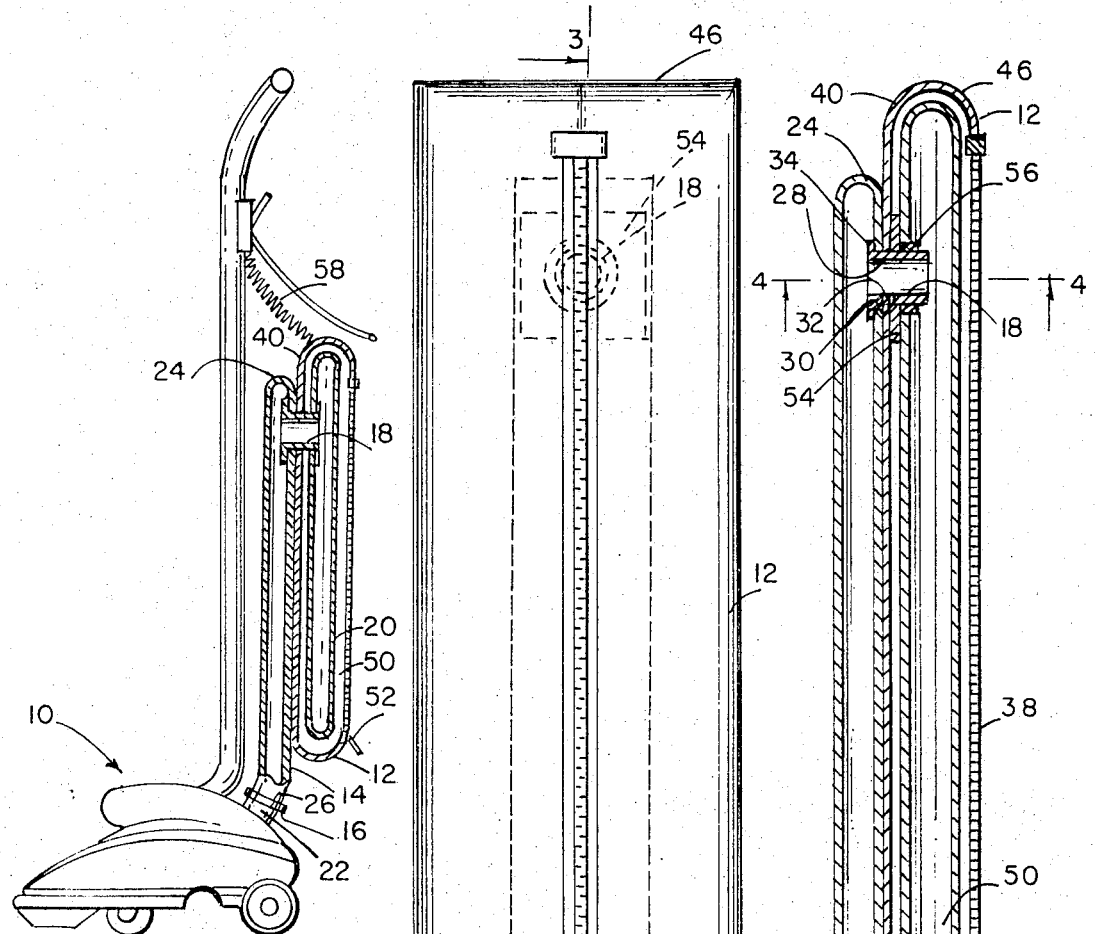
FIG. 1.
FIG. 2.
FIG. 3.
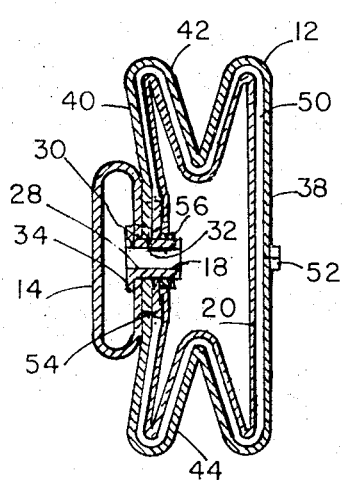
FIG. 4.
INVENTORS
Sol Howard and Robert Schaaf
BY *Friedman & Friedman*
ATTORNEYS 3,728,847

FILTER AND DUST COLLECTING BAG FOR UPRIGHT VACUUM CLEANERS

BACKGROUND OF THE INVENTION

This invention relates generally to filter and dust collecting bags to be used with upright vacuum cleaners and more particularly to those adapted to use exchangeable, removable and disposable filter and dust collecting bags. In such vacuum cleaners the filter and dust collecting bags therefor provided are usually coupled directly to the dust-laden air outlet part of the machine. In the process of removal by uncoupling, dust and dirt are frequently spilled. This, as well known, is undesirable, inconvenient and annoying.

In general, disposable filter and dust collecting bags are formed of flexible and air permeable filter paper or similar material capable of separating the substances to be removed from the air stream in which they are entrained. The filter bag material is subjected to considerable strain imposed by the air stream as well as by the weight of the material that is being removed, wherein no supporting or reinforcing means are provided.

SUMMARY OF THE INVENTION

A vacuum cleaner filter and dust collecting bag comprised of a main bag constructed of a flexible and air permeable material having the sides gusseted, thus enabling them to expand or to be folded and of an air conducting tube, a dust impervious material provided with a coupling suitable for attaching to an upright vacuum cleaner at one end, the other end of the air conducting tube secured to the main bag, a coupling collar of a dust impervious material extending into the main bag, the coupling collar being adapted for the attachment of a disposable air pervious lining or insert for the main bag, the main bag being provided with means for attaching to an upright vacuum cleaner and one wall of the main bag being provided with opening or closing means along its length for the insertion and removal of the lining.

Accordingly, an object of the present invention is to provide an improved vacuum cleaner filter and dust collecting bag which overcomes the disadvantages of the prior art bags.

Another object of the invention is to provide an easily removable filter and dust collector bag wherein the intake is arranged to prevent spillage.

A further object of the present invention is to provide supporting and reinforcing means for the removable collecting lining or insert.

A still further object of this invention is to provide a filter bag with a removable and exchangeable or disposable lining or insert, wherein the linings may be readily and efficiently inserted and air tightly attached without the use of clamps or similar devices.

Yet another object of this invention is to provide an outer bag which readily adapts itself to the volume of its contents.

And another object of this invention is to provide a vacuum cleaner filter bag in which linings or inserts of various dimensions, shapes or designs may be used.

And still yet another object of this invention is to provide a filter bag which is readily adaptable to or modifiable for use in any upright vacuum cleaner.

And still yet an additional object of the present invention is to provide a device having the objectives as mentioned which may be readily and efficiently manufactured at low cost.

BRIEF DESCRIPTION OF THE DRAWINGS

Having in mind the above and other objects that will be evident from an understanding of this disclosure, the invention comprises the devices, combinations and arrangements of parts as illustrated in the presently preferred embodiment of the invention which is hereinafter set forth in such detail as to enable those skilled in the art readily to understand the function, operation, construction and advantages of it, when read in conjunction with the accompanying drawings, in which:

FIG. 1 is a side elevational view, partially sectional and fragmented, illustrating the invention when mounted in an upright vacuum cleaner;

FIG. 2 is a front elevational view of the vacuum cleaner dust collector and filter bag in accordance with the present invention;

FIG. 3 is a sectional view taken along line 3—3 of FIG. 2; and

FIG. 4 is a sectional view taken along line 4—4 of FIG. 3;

DESCRIPTION OF THE PREFERRED EMBODIMENT

Referring now to the figures of the drawing in detail for purposes of illustration, FIG. 1 shows the invention in detail in its operative environment as installed onto a suitable upright vacuum cleaner 10. The invention comprises bag 12, air conducting tube 14, intake coupling 16, disposable bag coupling 18, dust collecting lining or insert 20 and opening and closing means 52.

Air conducting tube 14, while preferably constructed of an air tight and flexible material such as plastic, may be constructed of any material suitable to retain or prevent the passage of the materials such as dirt or dust through the walls of the air conducting tube 14. While shown in FIG. 4 as being elliptical in cross section, it may be of any suitable cross section. As shown in the drawings, air conducting tube 14 is disposed along a rear wall 40 of the bag 12, substantially along the entire length thereof, and is attached thereto by some suitable means, depending upon the materials used for the bag 12 and the tube 14, such as stitching, cementing, etc.

One end of tube 14, hereinafter designated as the upper end 24, is closed by some suitable means, such as stitching (or because of one piece construction). The other end of tube 14, hereinafter designated as lower end 26, is provided with intake coupling means 16. The coupling means 16 are adapted to be secured to a complementary coupling element of a vacuum cleaner outlet port 22, thereby providing for the passage of the dirt laden air into the lower end 26 of tube 14.

For the proper passage of the dirt laden air from the air conducting tube 14, the tube 14 is provided with an aperture 30, hereafter referred to as tube aperture 30, at substantially its upper end 24. The tube aperture 30 is positioned in confronting relationships with a similar aperture 32, hereinafter referred to as bag aperture 32, of the rear wall 40 of the bag 12. The coupling 18 includes a mounting ring or collar 28 provided with a flange 34. The collar 28 passes through the tube aperture 30 and the bag aperture 32. Flange 34 serves to hold and secure the collar 28 against the inner side of the air conducting tube 14.

Bag 12 is formed of an air permeable material, preferably cloth, and is of substantially rectangular shape. The bag 12 includes front and rear walls 38 and 40, respectively, which are connected by means of a pair of opposing and gussetted side walls 42 and 44, as shown in FIG. 4. Upper and lower ends 46 and 48, respectively, of the bag 12 are preferably closed. This closure may be accomplished by any suitable means, such as stitching. Accordingly, the bag 12 defines an interior compartment 50. Bag 12 is dimensioned to accommodate a disposable type insert 20.

Bag 12 is provided with opening and closing access means 52, such as a zipper opening and closure, upon one of its walls, preferably, front wall 38. Access means 52 thus provides for the facile and convenient insertion or removal, or change of disposable lining or insert 20.

As hereinbefore stated, the tube 14 is provided with the tube aperture 30 positioned in confronting relationships with the similar bag aperture 32 in the bag 12, and the collar 28 of the coupling 18 passes through these apertures 30, 32. To properly secure the coupling collar 28 to bag 12, a flange plate 54 is securely fitted upon the collar 28 and is secured to the bag 12 by suitable means such as stitching or cement. Flange plate 54, as well as the coupling collar 28, may be of relatively inexpensive material, such as cardboard. The construction of such collars and flange plates is well known in the art. To provide a dust tight seal as well as to efficiently secure and removably hold the insert 20, the coupling 18 is provided with gasket 56.

The characteristics and nature of disposable filter linings or inserts, such as the insert 20, is well known in the art and need not be described.

As shown in FIG. 1, the bag 12 may be provided with attachment means such as, for example, a spring clamp 58 for readily attaching and detaching the bag 12 to and from the upright vacuum cleaner 10.

In order to properly install the device of the present invention, the coupling means 16 is attached to the complementary coupling element on the vacuum cleaner outlet port 22, or similar device. By the use of a suitable coupling means, or by providing exchangeable adapters, the bag may be adapted to be connected to devices having dust laden air outlet ports of various shapes or designs.

For convenient operation, the bag 12 is attached to the cleaner handle or other convenient location by means of clamp 58. With the disposable filter insert 20 secured upon coupling 18, the vacuum cleaner 10 may be placed in operating condition. The dust laden air is forced by the air directing means of the vacuum cleaner 10 into the air conducting tube 14, through the coupling 18 and into the disposable filter insert 20.

As well known in the art, the dirt particles in the air stream, being unable because of their size to pass through the pores in the walls of the disposable filter insert 20, will tend to accumulate because of the action of gravity in the bottom of the liner 20. The air, because of the air permeable characteristic of the material of bag 12, will flow through to the outside. Because of the gussetted side walls 42 and 44, the bag 12 will expand to accommodate the retained dust and dirt in the insert 20.

In order to remove the insert 20, or to exchange it for another, it is only necessary to open the access means 52 and remove the insert 20 from the coupling 18. As can be readily seen, inserts of various sizes or shapes may be used, being limited only by the maximum capacity of the bag 12 as designed. Bag 12, being readily removable, permits easy storage of the vacuum cleaner 10.

It is also readily understood that the present invention is easily adaptable and modifiable for use with other machines such as grinders, saws and the like where an air stream is used or may be desirable to be used to collect and remove unwanted or undesirable particles.

Numerous alterations of the structure herein disclosed will suggest themselves to those skilled in the art. However, it is to be understood that the present disclosure relates to a preferred embodiment of the invention which is for purposes of illustration only, and not to be construed as a limitation of the invention.

What is claimed is:

1. A filter and dust collecting device for vacuum cleaners, said device comprising an air permeable bag, said bag including front and rear walls, side walls and closed opposite end walls defining an interior compratment, an air conducting tube, securing means longitudinally attaching said tube externally along an outer surface of said rear wall of said bag in a side-to-side relationship with one upper end portion of said tube disposed adjacent to one upper end portion of said bag and an opposite lower end portion of said tube disposed adjacent to an opposite lower end portion of said bag, said one upper end portion of said tube being provided with an aperture disposed in confronting relationship with a similar aperture provided in said rear wall of said one upper end portion of said bag, coupling means extending through said apertures for passing dust laden air from said tube through said coupling means into said interior compartment of said bag, said coupling means including flange means disposed within said one upper end portion of said tube to hold said coupling means securely against an upper inner surface of said tube, said coupling means being provided with flange plate means securely fitted on said coupling means and secured to an upper inner surface of said rear wall of said bag to securely position said coupling means relative to said one upper end portion of said bag, said coupling means further including attachment means disposed within said interior compartment of said bag to receive an air permeable removable liner into which the dust laden air passes, said attachment means extending toward said front wall of said one upper end portion of said bag, said bag being of selected dimensions to accommodate the liner therein, said bag being provided with opening and closing means disposed longitudinally along said front wall from said one upper end portion of said bag to said opposite lower end portion of said bag to permit insertion and removal of the liner therein for connection and removal from said attachment means, said opening and closing means extending above said coupling means to provide access to said coupling means, and an intake coupling disposed on said opposite lower end portion of said tube for connecting said opposite lower end portion of said tube to a dust laden air outlet port of a vacuum cleaner.

2. A device according to claim 1, wherein said bag is cloth.

3. A device according to claim 1, wherein said attachment means includes a gasket disposed on an end of said coupling means.

4. A device according to claim 1, wherein said bag is provided at substantially its upper end with means for attaching said upper end of said bag to a handle of the vacuum cleaner.

5. A device according to claim 1, wherein said side walls of said bag are gusseted for expanding said bag to accommodate retained dust and dirt in the liner.

6. A device according to claim 1, wherein said tube is constructed of an air tight and flexible material.

7. A device according to claim 6, wherein said flexible material of said tube is plastic.

8. A device according to claim 1, wherein said bag is cloth and said tube is constructed of an air tight and flexible plastic material, said attachment means including a gasket disposed on an end of said coupling means to provide a dust tight seal and to secure and removably hold the liner on said coupling means, said side walls of said bag being gusseted for expanding said bag to accommodate retained dust and dirt in the liner, said bag being provided at substantially its upper end with means for attaching said upper end of said bag to a handle of the vacuum cleaner.

* * * * *